United States Patent
Sun et al.

(10) Patent No.: US 11,404,686 B2
(45) Date of Patent: Aug. 2, 2022

(54) NEGATIVE ELECTRODE ACTIVE MATERIAL FOR LITHIUM ION BATTERY

(71) Applicant: SEKISUI CHEMICAL CO., LTD., Osaka (JP)

(72) Inventors: Ren-de Sun, Osaka (JP); Shoji Nozato, Osaka (JP); Akira Nakasuga, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 214 days.

(21) Appl. No.: 16/607,190

(22) PCT Filed: Apr. 26, 2018

(86) PCT No.: PCT/JP2018/017085
§ 371 (c)(1),
(2) Date: Oct. 22, 2019

(87) PCT Pub. No.: WO2018/199265
PCT Pub. Date: Nov. 1, 2018

(65) Prior Publication Data
US 2020/0388826 A1    Dec. 10, 2020

(30) Foreign Application Priority Data
Apr. 28, 2017    (JP) .............................. JP2017-090769

(51) Int. Cl.
*H01B 1/04*    (2006.01)
*H01B 1/08*    (2006.01)
(Continued)

(52) U.S. Cl.
CPC .............. *H01M 4/134* (2013.01); *H01B 1/04* (2013.01); *H01B 1/08* (2013.01); *H01M 4/366* (2013.01);
(Continued)

(58) Field of Classification Search
CPC ........... H01B 1/04; H01B 1/08; H01M 4/134; H01M 4/366; H01M 4/386; H01M 4/625
See application file for complete search history.

(56) References Cited

U.S. PATENT DOCUMENTS

| | | | |
|---|---|---|---|
| 9,203,077 B2 * | 12/2015 | Oh ........................ | H01M 4/366 |
| 10,741,832 B2 * | 8/2020 | Sun ....................... | H01M 4/505 |

(Continued)

FOREIGN PATENT DOCUMENTS

| | | |
|---|---|---|
| EP | 3 199 494 | 8/2017 |
| EP | 3 203 555 | 8/2017 |

(Continued)

OTHER PUBLICATIONS

Swain et al "Carbon coating on the current collector and LiFePO4 nanoparticles—influence of sp2 and sp3-like disordered carbon on the electrochemical properties", Journal of Power Sources 293 (2015) 613-625.*

(Continued)

*Primary Examiner* — Mark Kopec
(74) *Attorney, Agent, or Firm* — Wenderoth, Lind & Ponack, L.L.P.

(57) ABSTRACT

The present invention provides a negative electrode active material for lithium ion batteries which has high adhesiveness and followability to a negative electrode active material in volume expansion and contraction during charging and discharging, excellent contact and adhesiveness to a conductive aid, a binder, and a current collector, and a high suppressing effect on decomposition of an electrolyte solution. Due to these features, the negative electrode active material for lithium ion batteries is capable of achieving excellent cycle characteristics and rate characteristics and high coulombic efficiency. The present invention also provides a negative electrode for lithium ion secondary batteries and a lithium ion secondary battery each including the (Continued)

negative electrode active material for lithium ion batteries, and a method for producing a negative electrode active material for lithium ion batteries. Provided is a negative electrode active material for lithium ion batteries, including: a negative electrode active material; and a coating layer containing an amorphous carbon on a surface of the negative electrode active material, the amorphous carbon constituting the coating layer having a ratio of a peak derived from a sp2 component to a peak derived from a sp3 component of 1 or higher as determined by $^{13}$C solid-state NMR, and a ratio of a peak derived from aromatic carbon having a bond with a hydroxy group to the peak derived from the sp2 component of 0.2 or lower.

15 Claims, 8 Drawing Sheets

(51) Int. Cl.
| | | |
|---|---|---|
| *H01M 4/134* | (2010.01) | |
| *H01M 4/36* | (2006.01) | |
| *H01M 4/38* | (2006.01) | |
| *H01M 4/62* | (2006.01) | |
| *H01M 10/0525* | (2010.01) | |
| *H01M 4/02* | (2006.01) | |

(52) U.S. Cl.
CPC .......... *H01M 4/386* (2013.01); *H01M 4/622* (2013.01); *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 2012/0129052 A1* | 5/2012 | Bauer | H01M 4/364 |
| | | | 429/231.1 |
| 2013/0157127 A1* | 6/2013 | Hirose | B60L 58/27 |
| | | | 429/211 |
| 2015/0243969 A1* | 8/2015 | Ku | H01M 4/364 |
| | | | 429/231.5 |
| 2015/0263339 A1 | 9/2015 | Kouzu et al. | |

FOREIGN PATENT DOCUMENTS

| | | |
|---|---|---|
| JP | 2013-131324 | 7/2013 |
| JP | 2014-075325 | 4/2014 |
| JP | 2014-183043 | 9/2014 |
| JP | 2017-059398 | 3/2017 |
| TW | 201424097 | 6/2014 |
| WO | 2016/047606 | 3/2016 |
| WO | 2016/052407 | 4/2016 |

OTHER PUBLICATIONS

Nishihara et al "Fabrication of a highly conductive ordered porous electrode by carbon-coating of a continuous mesoporous silica film", Chem. Mater. 2011, 3144-3151.*

Extended European Search Report dated Dec. 3, 2020 in corresponding European Patent Application No. 18791639.0.

International Search Report dated Aug. 7, 2018 in International (PCT) Application No. PCT/JP2018/017085.

Liu et al., "Size-Dependent Fracture of Silicon Nanoparticles During Lithiation", American Chemical Society, vol. 6, No. 2, pp. 1522-1531, 2012.

* cited by examiner (a)

(b)

(a)

(b)

NEGATIVE ELECTRODE ACTIVE MATERIAL FOR LITHIUM ION BATTERY

TECHNICAL FIELD

The present invention relates to a negative electrode active material for lithium ion batteries which has high adhesiveness and followability to a negative electrode active material in volume expansion and contraction during charging and discharging, excellent contact and adhesiveness to a conductive aid, a binder, and a current collector, and a high suppressing effect on decomposition of an electrolyte solution. Due to these features, the negative electrode active material for lithium ion batteries is capable of achieving excellent cycle characteristics and rate characteristics and high coulombic efficiency. The present invention also relates to a negative electrode for lithium ion secondary batteries and a lithium ion secondary battery each including the negative electrode active material for lithium ion batteries, and a method for producing a negative electrode active material for lithium ion batteries.

BACKGROUND ART

Lithium ion secondary batteries are used in portable electronic devices and various other electronic and electrical devices. Lithium ion secondary batteries have a basic structure including a positive electrode current collector, a positive electrode, a separator, a negative electrode, and a negative electrode current collector. The positive electrode and negative electrode contain materials that can intercalate lithium.

Active materials usually used in the negative electrode are carbon materials, in particular graphite (theoretical capacity: 372 mAh/g). For further downsizing of electronic devices and for application to electric vehicles and energy storage systems, however, negative electrode materials having higher theoretical capacity are needed.

Known negative electrode active materials that have higher theoretical capacity than graphite include metals that can form alloys with Li, such as Al, Sn, Sb, and Si, and alloy materials of these metals. Among these materials, Si has particularly high lithium storage capacity. Its theoretical capacity has been reported to reach 4,200 mAh/g.

When silicon is used as a negative electrode active material, however, the silicon undergoes significant volume expansion and contraction (>300%) with the lithium intercalation and deintercalation, and thus the active material breaks after repeated charging and discharging. Use of silicon as a negative electrode active material is thus known to result in very poor battery cycle characteristics.

Non-Patent Literature 1 reports that the silicon fracture can be avoided by using nanoparticles having a size of 150 nm or smaller in place of conventional large silicon particles on the order of micrometers. However, this does not provide a fundamental solution, as the volume expansion and contraction during charging and discharging still persist. Since the volume expansion and contraction during charging and discharging are inelastic deformations, even with the use of silicon nanoparticles, repeated charging and discharging cause poor contact between the silicon particles or between the silicon particles and conductive aids, thus leading to poor cycle characteristics.

Carbon coating of silicon particles has been reported to be an effective method to enhance the cycle characteristics of silicon negative electrodes. For example, Patent Literature 1 discloses a carbon-coated silicon particle that has a silicon carbide layer formed on at least part of the interface between the carbon coating film and the silicon particle.

CITATION LIST

Patent Literature

Patent Literature 1: JP 2014-75325 A

Non-Patent Literature

Non-Patent Literature 1: Xiao Hua Liu et al, "Size-Dependent Fracture of Silicon Nanoparticles During Lithiation", VOL. 6, NO. 2, 1522-1531 (2012)

SUMMARY OF INVENTION

Technical Problem

In the carbon-coated silicon particle having a silicon carbide intermediate layer disclosed in Patent Literature 1, however, the surface coating carbon layer may have reduced adhesiveness due to the hardness and brittleness of silicon carbide. In addition, the carbon-coated silicon particle may lead to an increase in the internal resistance due to the insulating nature of silicon carbide. The carbon-coated silicon particle thus has a limited improving effect on battery characteristics.

In lithium ion batteries, the electrolyte solution near the surface of the active material decomposes during charging and discharging (particularly the initial charging and discharging) to deposit insoluble salts such as $Li_2O$, $Li_2CO_3$, or LiF on the surface of the active material. This sometimes results in formation of a solid electrolyte interphase (SEI) film on the surface of the active material.

Such a SEI film is electrically insulating. The film thus passivates the active sites on the negative electrode material surface, thereby suppressing further decomposition of the electrolyte solution. Appropriate formation of the SEI film in lithium ion batteries plays an important role to ensure stable battery characteristics. Uneven or excessive deposition, however, may reduce battery characteristics.

The negative electrode particularly has low potential and is likely to cause the decomposition of the electrolyte solution as compared with the positive electrode. Thus, there is a demand for a negative electrode active material that can solve these problems.

In view of the situation in the art, the present invention aims to provide to a negative electrode active material for lithium ion batteries which has high adhesiveness and followability to a negative electrode active material in volume expansion and contraction during charging and discharging, excellent contact and adhesiveness to a conductive aid, a binder, and a current collector, and a high suppressing effect on decomposition of an electrolyte solution. Due to these features, the negative electrode active material for lithium ion batteries is capable of achieving excellent cycle characteristics and rate characteristics and high coulombic efficiency. The present invention also aims to provide a negative electrode for lithium ion secondary batteries and a lithium ion secondary battery each including the negative electrode active material for lithium ion batteries, and a method for producing a negative electrode active material for lithium ion batteries.

Solution to Problem

The present invention relates to a negative electrode active material for lithium ion batteries, including: a negative electrode active material; and a coating layer containing an amorphous carbon on a surface of the negative electrode active material, the amorphous carbon constituting the coating layer having a ratio of a peak derived from a sp2 component to a peak derived from a sp3 component of 1 or higher as determined by $^{13}$C solid-state NMR, and a ratio of a peak derived from aromatic carbon having a bond with a hydroxy group to the peak derived from the sp2 component of 0.2 or lower.

The present invention is described in detail below.

The present inventors made intensive studies to find out that forming a coating layer which contains carbon derived from a predetermined resin and has predetermined physical properties on a surface of a negative electrode active material can provide a negative electrode active material for lithium ion batteries which has high adhesiveness and followability to a negative electrode active material in volume expansion and contraction during charging and discharging and excellent contact and adhesiveness to a conductive aid, a binder, and a current collector. The inventors further found out that such a negative electrode active material for lithium ion batteries also has a high suppressing effect on decomposition of an electrolyte solution, and thus is capable of achieving excellent cycle characteristics and rate characteristics and high coulombic efficiency. The inventors thus completed the present invention.

The negative electrode active material for lithium ion batteries of the present invention includes a negative electrode material and a coating layer containing an amorphous carbon on a surface of the negative electrode active material.

The negative electrode active material may be any negative electrode active material that can intercalate and deintercalate lithium ions. Examples thereof include lithium metal, lithium alloys, silicon, silicon-containing compounds, silicon-containing alloys, tin, tin-containing alloys, metal oxides, metal sulfides, metal nitrides, and carbon materials such as graphite.

The negative electrode active material preferably allows the intercalation and deintercalation reactions of lithium ions to proceed at 0.0 V or higher and lower than 2.0 V vs. Li$^+$/Li.

The phrase "intercalation reaction of lithium ions proceeds at 0.0 V (vs. Li$^+$/Li) or higher and lower than 2.0 V (vs. Li$^+$/Li)" means that lithium ion intercalation into the negative electrode active material starts at lower than 2.0 V (vs. Li$^+$/Li) and ends at 0.0 V (vs. Li$^+$/Li) or higher.

The phrase "deintercalation reaction of lithium ions proceeds at 0.0 V (vs. Li$^+$/Li) or higher and lower than 2.0 V (vs. Li$^+$/Li)" means that lithium ion deintercalation from the negative electrode active material starts at 0.0 V (vs. Li$^+$/Li) or higher and ends at lower than 2.0 V (vs. Li$^+$/Li).

For example, the negative electrode active material that allows the intercalation and deintercalation reactions of lithium ions to proceed at 0.0 V (vs. Li$^+$/Li) or higher and lower than 2.0 V (vs. Li$^+$/Li) may be a metal, a metal compound, or an organic material.

The metal may be any metal that can react with a lithium ion to form an alloy. Examples thereof include Li, Mg, Ca, Al, Si, Ge, Sn, Pb, As, Sb, Bi, Ag, Au, Zn, Cd, Hg, and Ti. From the standpoint of the volume energy density and the weight energy density, preferred among them are Li, Al, Si, Ge, Sn, Ti, and Pb, with Li, Si, Sn, and Ti being more preferred. Si and Sn are still more preferred because they have higher reactivity with lithium ions. The metal may be any one of the metals or an alloy containing two or more of the metals. Alternatively, the metal may be a mixture of two or more metals. For more improved stability, the metal may be an alloy containing a metal other than the above metals, or may be doped with a non-metal element such as P or B.

Examples of the metal compound include metal oxides, metal nitrides, and metal sulfides. From the standpoint of further enhancement of stability, metal oxides are preferred. Preferred metal oxides are silicon oxide, tin oxide, titanium oxide, tungsten oxide, niobium oxide, and molybdenum oxide because they have higher reactivity with lithium ions.

The metal oxide may be any one of the metal oxides, or an oxide of an alloy containing two or more metals. The metal oxide may be a mixture of two or more metal oxides. For more improved stability, the metal oxide may be doped with a different metal or a non-metal element such as P or B.

The "titanium oxide" includes lithium titanate and H$_2$Ti$_{12}$O$_{25}$.

The negative electrode active material is preferably a silicon-containing compound. Examples of the silicon-containing compound include Si, silicon-containing alloys, and silicon oxide.

The negative electrode active material may be in a particle form, a flake form, a fiber form, a tubular form, a sheet form, or a porous form, for example. The negative electrode active material is preferably in a particle form or a flake form.

When the negative electrode active material is in a particle form, the lower limit of the average particle size thereof is preferably 0.001 μm (1 nm), more preferably 0.005 μm (5 nm), still more preferably 0.01 μm (10 nm). The upper limit thereof is preferably 40 μm, more preferably 10 μm, still more preferably 1 μm, particularly preferably 0.2 μm (200 nm).

The negative electrode active material for lithium ion batteries of the present invention includes a coating layer containing an amorphous carbon. Such a coating layer has high adhesiveness and followability to a negative electrode active material in volume expansion and contraction during charging and discharging. The coating layer thus exhibits a stabilizing effect on change in the shape of the negative electrode active material, and the negative electrode active material has excellent adhesiveness to a conductive aid and a binder. As a result, cracks are less likely to be formed between the negative electrode active material and the current collector during charging and discharging, so that good charge/discharge cycle stability can be achieved.

The coating also passivates the active sites on the negative electrode active material surface, thereby suppressing the decomposition of the electrolyte solution. The coating thus can significantly reduce the amount of insoluble salts deposited on the surface of the negative electrode active material for lithium ion batteries, and can prevent a reduction in battery characteristics accompanying excessive SEI film formation.

In addition, the coating layer can be produced by a simple process without high-temperature firing process.

The coating layer may be formed on at least part of the surface of the negative electrode active material, or may be formed to coat the entire surface of the negative electrode active material. For the coating layer to further exhibit coating effects, the coating layer is preferably formed to continuously and uniformly coat the entire surface of the negative electrode active material.

The coating layer preferably has high denseness. In the present invention, formation of a coating layer having high denseness makes it possible to efficiently passivate the surface active sites that cause the decomposition of the electrolyte solution during charging and discharging.

Although there is no strict definition of the "denseness" for the dense coating layer, "dense" in the present invention is defined as follows: when individual nanoparticles are observed using a high resolution transmission electron microscope, as shown in FIG. 1, the coating layer on the particle surface is clearly observed and the coating layer is continuously formed.

Preferably, the coating layer is formed continuously and uniformly on the entire surface of the negative electrode active material and has pores at the molecular level (with a pore size of 1 nm or smaller) in the coating film. Such pores at the molecular level allow lithium ions to freely pass through the coating film during charging and discharging.

The amorphous carbon constituting the coating layer has a ratio of a peak derived from a sp2 component to a peak derived from a sp3 component (peak derived from sp2 component/peak derived from sp3 component) of 1 or higher as determined by $^{13}C$ solid-state NMR.

Analysis of the amorphous carbon by $^{13}C$ solid-state NMR clearly shows a peak derived from a sp2 component (100 to 140 ppm), a peak derived from a sp3 component (0 to 100 ppm), and a peak derived from aromatic carbon having a bond with a hydroxy group (140 to 160 ppm). In the present invention, in particular, the ratio of the peak derived from the sp2 component to the peak derived from the sp3 component is 1 or higher, so that the coating layer has appropriate flexibility to exhibit excellent adhesiveness and followability to the negative electrode active material.

The peak ratio is preferably 1.2 or higher and preferably 100 or lower.

The "aromatic carbon" means carbon constituting an aromatic ring.

The amorphous carbon constituting the coating layer has a ratio of the peak derived from aromatic carbon having a bond with a hydroxy group to the peak derived from the sp2 component (peak derived from aromatic carbon having bond with hydroxy group/peak derived from sp2 component) of 0.2 or lower as determined by $^{13}C$ solid-state NMR.

In the present invention, in particular, the ratio of the peak derived from aromatic carbon having a bond with a hydroxy group to the peak derived from the sp2 component is 0.2 or lower, so that the coating layer has a high carbonization ratio.

The peak ratio is preferably 0.15 or lower. The lower limit of the peak ratio is not particularly limited, but is 0.0001.

The amorphous carbon constituting the coating layer has an amorphous structure in which a sp2 bond and a sp3 bond are both present, and includes carbon. Preferably, the peak intensity ratio of G band to D band obtained from the Raman spectrum is 1.0 or higher.

In the analysis of the amorphous carbon by Raman spectroscopy, two peaks including G band (at around 1,580 $cm^{-1}$) corresponding to the sp2 bond and D band (at around 1,360 $cm^{-1}$) corresponding to the sp3 bond can be clearly observed. In the case where the carbon material is crystalline, either one of the two bands is minimized. For example, in the case of a monocrystalline diamond, G band at around 1,580 $cm^{-1}$ is hardly observed. In contrast, in the case of a highly pure graphite structure, D band at around 1,360 $cm^{-1}$ hardly appears.

In the present invention, particularly when the peak intensity ratio of G band to D band (peak intensity of G band/peak intensity of D band) is 1.0 or higher, the formed amorphous carbon film has excellent flexibility.

When the peak intensity ratio is lower than 1.0, the flexibility of the film is insufficient. In addition, the adhesiveness and strength of the film are lowered.

The peak intensity ratio is more preferably 1.2 or higher and is preferably 10 or lower.

The coating layer may contain an element other than carbon. Examples of the element other than carbon include nitrogen, hydrogen, and oxygen. The amount of such an element is preferably 10 atom % or less relative to the total of carbon and the element other than carbon.

The negative electrode active material for lithium ion batteries of the present invention preferably has a zeta potential (surface potential) of 0 to −60 mV.

When the zeta potential is within the range, the negative electrode active material for lithium ion batteries has excellent dispersibility during production of an electrode, and also can have further improved adhesiveness to a conductive aid, a binder, and a current collector.

The zeta potential can be measured using a commercially available micro-electrophoresis zeta potential analyzer (M502, available from Nihon Rufuto Co., Ltd.), for example.

The amorphous carbon constituting the coating layer is preferably derived from carbon contained in an oxazine resin. The oxazine resin can be carbonized at low temperature and therefore allows cost reduction.

The oxazine resin is a resin commonly classified as a phenolic resin and is a thermosetting resin obtainable by reacting a phenol and formaldehyde as well as an amine. In the case where the phenol used is of a type further having an amino group on the phenol ring, such as p-aminophenol, no amine needs to be added in the reaction and the oxazine resin tends to be easily carbonized. In terms of carbonization, the use of a naphthalene ring instead of a benzene ring further facilitates carbonization.

Examples of the oxazine resin include benzoxazine resin and naphthoxazine resin. Among these, preferred is naphthoxazine resin because it can be carbonized at the lowest temperature. The structure of the oxazine resin is partly shown below by the formula (1) representing a partial structure of the benzoxazine resin and the formula (2) representing a partial structure of the naphthoxazine resin.

The oxazine resin refers to a resin having a six-membered ring added to a benzene ring or naphthalene ring. The six-membered ring includes oxygen and nitrogen, which is the origin of the name.

[Chem. 1]

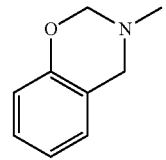
(1)

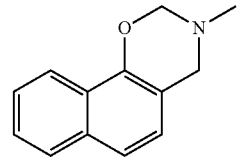
(2)

The use of the oxazine resin enables formation of an amorphous carbon film at remarkably low temperature compared to the case where other resins such as an epoxy resin are used. Specifically, the oxazine resin can be carbonized at a temperature of 200° C. or lower. In particular, the naphthoxazine resin can be carbonized at further lower temperature.

As above, carbonization at lower temperature by using an oxazine resin enables formation of a coating layer containing an amorphous carbon and having high denseness.

The reason why a coating layer containing an amorphous carbon and having high denseness can be formed is not clarified. However, it is presumably because, in the case where naphthoxazine resin is used as an oxazine resin, for example, the naphthalene structures in the resin are locally connected by heating at low temperature and a layered structure at the molecular level is formed. The layered structure without being subjected to high-temperature treatment is not developed to the long-distance periodic structure like the graphite structure and therefore shows no crystallinity.

Whether the obtained carbon has a graphite-like structure or an amorphous structure can be confirmed by determining whether a peak is detected at a position where $2\theta$ is 26.4° by an X-ray diffraction method described later.

Examples of the material usable as a raw material of the naphthoxazine resin include dihydroxy naphthalene, which is a phenol, formaldehyde, and an amine. These materials will be specifically described later.

The amorphous carbon is preferably one obtainable by heat-treating the oxazine resin at a temperature of 150° C. to 350° C. In the present invention, the use of naphthoxazine resin, which can be carbonized at low temperature, enables preparation of an amorphous carbon at relatively low temperature.

Preparation at low temperature is advantageous in that an amorphous carbon can be produced at a lower cost in a simple process compared to a conventional one.

The heat treatment temperature is more preferably 170° C. to 300° C.

Additional heat treatment may be performed at 350° C. to 800° C., according to purpose.

The coating layer preferably has a nitrogen content of 0 to 5% by weight. When the nitrogen content is within the range, a coating layer having better physical properties than a pure carbon film can be obtained.

The coating layer preferably has an average thickness of 0.5 nm to 1.0 µm, more preferably 1.0 nm to 100 nm, particularly preferably 2.0 nm to 50 nm. When the average thickness of the coating layer is within the range, the active sites on the negative electrode active material surface can be efficiently passivated. As a result, the decomposition of the electrolyte solution during charging and discharging is also efficiently suppressed, leading to good initial coulombic efficiency and good long-term cycle characteristics.

The coating layer preferably has a coefficient of variation (CV value) of thickness of 10% or less. The coating layer having a CV value of thickness of 10% or less is uniform and has less variation in thickness. Such a coating layer can have desired functions (dissolution of ions and maintenance of crystallinity) even when it is thin.

The upper limit of the CV value of the thickness of the coating layer is preferably 8.0%. The lower limit thereof is not particularly limited and is preferably 0.5%.

The CV value (%) of the thickness is a value in percentage obtained by dividing the standard deviation by the average thickness and is a numerical value obtained by the following equation. A smaller CV value means smaller variation in thickness.

$$\text{CV value (\%) of thickness} = (\text{Standard deviation of thickness/average thickness}) \times 100$$

The average thickness and standard deviation can be measured using, for example, FE-TEM.

The coating layer preferably has good adhesiveness to the negative electrode active material. There is no clear definition of "adhesiveness", but the coating layer is preferably not peeled off even when a mixture of the negative electrode active material for lithium ion batteries, a resin, a plasticizer, and a dispersant is treated using a bead mill.

In the present invention, in analysis of the coating layer by time-of-flight secondary ion mass spectrometry (TOF-SIMS), at least one selected from the group consisting of a mass spectrum derived from the benzene ring and a mass spectrum derived from the naphthalene ring is preferably detected.

Detection of such mass spectra derived from the benzene ring and naphthalene ring confirms that the carbon constituting the coating layer is derived from the carbon contained in the oxazine resin.

The mass spectrum derived from the benzene ring herein refers to a mass spectrum at around 77.12 and the mass spectrum derived from the naphthalene ring herein refers to a mass spectrum at around 127.27.

The above analysis can be performed using a TOF-SIMS device (available from ION-TOF GmbH), for example.

In the present invention, in analysis of the coating layer by an X-ray diffraction method, no peak is preferably detected at a position where $2\theta$ is 26.4°.

The peak at a position where $2\theta$ is 26.4° is the crystalline peak of graphite. The absence of a peak at such a position indicates that the carbon constituting the coating layer has an amorphous structure. Furthermore, no peak is preferably detected at a position where $2\theta$ is 36°. The peak at the position where $2\theta$ is 36° is derived from SiC.

The above analysis can be performed using, for example, an X-ray diffractometer (SmartLab Multipurpose available from Rigaku Corporation).

One embodiment of the method for producing the negative electrode active material for lithium ion batteries of the present invention may be a method including: preparing a mixed solution containing formaldehyde, an aliphatic amine, and dihydroxy naphthalene; adding a negative electrode active material to the mixed solution and reacting the mixed solution at a predetermined temperature; and heat-treating the negative electrode active material after reaction.

In the method for producing the negative electrode active material for lithium ion batteries at the present invention, the step of preparing a mixed solution containing formaldehyde, an aliphatic amine, and dihydroxy naphthalene is carried out.

Since the formaldehyde is unstable, formalin, which is a formaldehyde solution, is preferably used. Formalin normally contains, in addition to formaldehyde and water, a small amount of methanol as a stabilizer. The formaldehyde used in the present invention may be formalin as long as the formaldehyde content is clear.

Paraformaldehyde may be mentioned as a polymerization form of formaldehyde. Paraformaldehyde is also usable as a raw material but is poor in reactivity. Accordingly, formalin mentioned above is preferably used.

The aliphatic amine is normally represented by $R-NH_2$, and R in the formula is preferably an alkyl group having a carbon number of 5 or less. Any alkyl group having a carbon number of 5 or less may be used. Examples of the alkyl group having a carbon number of 5 or less include methyl, ethyl, n-propyl, isopropyl, cyclopropyl, n-butyl, isobutyl, s-butyl, t-butyl, cyclobutyl, cyclopropylmethyl, n-pentyl, cyclopentyl, cyclopropylethyl, and cyclobutylmethyl groups.

Since a smaller molecular weight is preferred, the substituent R is preferably a methyl, ethyl, or propyl group. Preferred actual compounds include methylamine, ethylamine, and propylamine. Most preferred is methylamine, which has a smallest molecular weight.

Dihydroxy naphthalene has many isomers. Examples thereof include 1,3-dihydroxy naphthalene, 1,5-dihydroxy naphthalene, 1,6-dihydroxy naphthalene, 1,7-dihydroxy naphthalene, 2,3-dihydroxy naphthalene, 2,6-dihydroxy naphthalene, and 2,7-dihydroxy naphthalene.

Among these, preferred are 1,5-dihydroxy naphthalene and 2,6-dihydroxy naphthalene for their high reactivity. Moreover, 1,5-dihydroxy naphthalene is preferred because it has highest reactivity.

The ratio of the three components of dihydroxy naphthalene, an aliphatic amine, and formaldehyde in the mixed solution is most preferably 1 mol of an aliphatic amine and 2 mol of formaldehyde relative to 1 mol of dihydroxy naphthalene.

The optimum compounding ratio may not be strictly the above ratio because the raw materials could be lost by volatilization or the like during the reaction according to the reaction conditions. Preferably, an aliphatic amine and formaldehyde are compounded in amounts of 0.8 to 1.2 mol and 1.6 to 2.4 mol, respectively, relative to 1 mol of dihydroxy naphthalene.

With the amount of the aliphatic amine of 0.8 mol or more, the oxazine ring can be sufficiently formed and polymerization favorably proceeds. With the amount of the aliphatic amine of 1.2 mol or less, formaldehyde needed for the reaction is not excessively consumed and therefore the reaction proceeds smoothly, leading to preparation of desired naphthoxazine. Similarly, with the amount of formaldehyde of 1.6 mol or more, the oxazine ring can be sufficiently formed and polymerization favorably proceeds.

With the amount of formaldehyde of 2.4 mol or less, a side reaction is favorably reduced.

The mixed solution preferably contains a solvent for dissolving and reacting the three raw materials.

Examples of the solvent include solvents commonly used for dissolving resin, such as alcohols (e.g., methanol, ethanol, and isopropanol), tetrahydrofuran, dioxane, dimethylformamide, dimethylacetamide, dimethylsulfoxide, and N-methylpyrrolidone.

The amount of the solvent in the mixed solution is not particularly limited. Commonly, in the case where the amount of the raw materials including dihydroxy naphthalene, an aliphatic amine, and formaldehyde is 100 parts by mass, the amount of the solvent is preferably 300 to 20,000 parts by mass. When the amount of the solvent is 300 parts by mass or more, the solutes can be sufficiently dissolved in the solvent and therefore a uniform film can be obtained in formation of a film. When the amount of the solvent is 20,000 parts by mass or less, the concentration required for formation of a coating layer can be ensured.

In the method for producing the negative electrode active material for lithium ion batteries of the present invention, the step of adding a negative electrode active material to the mixed solution and reacting the mixed solution is carried out. As the reaction proceeds, a naphthoxazine resin layer can be formed on the surface of the negative electrode active material.

The reaction can proceed at normal temperature. For shortening of the reaction time, heating to 40° C. or higher is preferred. Continuous heating opens the formed oxazine ring, and the molecular weight increases along with the polymerization. Thus, what is called polynaphthoxazine resin is prepared. Attention should be paid to the reaction because excessive proceeding of the reaction increases the viscosity of the solution and such a solution is not suitable for forming a coating layer.

Alternatively, for example, the negative electrode active material may be added after the mixed solution of formaldehyde, an aliphatic amine, and dihydroxy naphthalene is reacted for a certain period of time.

For uniform coating of the particles, the particles are preferably dispersed during the coating reaction. The dispersion method may be any known method such as stirring, sonication, and rotation. For a better dispersion state, an appropriate dispersant may be added.

Moreover, the surface of the negative electrode active material may be uniformly coated with the resin by drying and removing the solvent with hot air or the like after the reaction step. Any heat drying method may be employed.

In the method for producing the negative electrode active material for lithium ion batteries of the present invention, the step of performing heat treatment is subsequently carried out. Through this step, the coating resin obtained in the previous step is carbonized to be formed into a coating layer containing an amorphous carbon. The heat treatment is preferably performed at a temperature of 150° C. to 350° C. The heat treatment may be further performed at 350° C. to 800° C.

Any heat treatment method may be employed, and examples thereof include a method of using a heating oven or an electric furnace.

The temperature in the heat treatment is 150° C. to 350° C. Since naphthoxazine resin that can be carbonized at low temperature is used in the present invention, an amorphous carbon can be obtained at still lower temperature. The upper limit of the heating temperature in this case is preferably 250° C.

The heat treatment may be performed in the air or in an inert gas such as nitrogen or argon. In the case of the heat treatment temperature of 250° C. or higher, the heat treatment is more preferably performed in an inert gas atmosphere.

According to another embodiment of the method for producing the negative electrode active material for lithium ion batteries of the present invention, a mixed solution containing triazine instead of the formaldehyde and the aliphatic amine may be used for the reaction. Specifically, the negative electrode active material for lithium ion batteries may be produced by a method including: preparing a mixed solution containing triazine and dihydroxy naphthalene; adding a negative electrode active material to the mixed solution and reacting the mixed solution; and performing heat treatment.

The triazine used is preferably represented by the following formula (3).

In the formula (3), R is an aliphatic alkyl group or an organic group containing an aromatic.

When R is an aliphatic alkyl group, R is preferably an alkyl group having a carbon number of 1 to 20.

From the standpoint of the carbonization ratio and the film denseness, the triazine is more preferably 1,3,5-trimethylhexahydro-1,3,5-triazine, where R is a methyl group.

[Chem. 2]

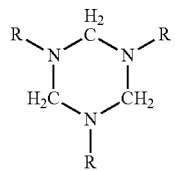

(3)

In particular, in production of the negative electrode active material for lithium ion batteries of the present invention, ultrasonication and stirring are preferably simultaneously performed during reaction. The ultrasonication and stirring are simultaneously performed preferably for 1 to 10 hours. The heating temperature in reaction is preferably 30° C. to 150° C. The particles washed after reaction are preferably dried at a temperature of 50° C. to 150° C.

The negative electrode active material for lithium ion batteries of the present invention is useful for applications such as lithium ion batteries for industrial use and general use and for automobiles.

The present invention also encompasses a negative electrode for lithium ion secondary batteries including: the negative electrode active material for lithium ion batteries of the present invention; a carbon material; a conductive aid; and a binder.

The binder is preferably at least one selected from the group consisting of styrene-butadiene rubber, carboxymethylcellulose, polyvinylidene fluoride, polyimide, acrylic resin, and butyral resin.

The present invention further encompasses a lithium ion secondary battery including the negative electrode for lithium ion secondary batteries of the present invention.

Advantageous Effects of Invention

The present invention can provide a negative electrode active material for lithium ion batteries which has high adhesiveness and followability to a negative electrode active material in volume expansion and contraction during charging and discharging, excellent contact and adhesiveness to a conductive aid, a binder, and a current collector, and a high suppressing effect on decomposition of an electrolyte solution. Due to these features, the negative electrode active material for lithium ion batteries is capable of achieving excellent cycle characteristics and rate characteristics and high coulombic efficiency. The present invention can also provide a negative electrode for lithium ion secondary batteries and a lithium ion secondary battery each including the negative electrode active material for lithium ion batteries, and a method for producing a negative electrode active material for lithium ion batteries.

DESCRIPTION OF EMBODIMENTS

Embodiments of the present invention are more specifically described with reference to, but not limited to, the following examples.

Example 1

(Formation of Coating Layer)

1,5-Dihydroxynaphthalene (hereinafter abbreviated as "1,5-DHN", available from Tokyo Chemical Industry Co., Ltd.), a 40% aqueous methylamine solution (available from FUJIFILM Wako Pure Chemical Corporation), and a 37% aqueous formaldehyde solution (available from FUJIFILM Wako Pure Chemical Corporation) were used as starting materials. In a flask, 400 mL of a mixed solution of the three materials in ethanol was prepared. The molar ratio of 1,5-DHN, methylamine, and formaldehyde was 1:1:2. The concentration of 1,5-DHN was 0.02 mol/L.

Subsequently, 6 g of silicon raw material particles (Si particles, available from Sigma-Aldrich, average particle size: 100 nm) were added to the mixed solution in ethanol. The mixed solution was then reacted for five hours while maintaining the temperature of the solution at 50° C. and simultaneously ultrasonicating and stirring the solution. After reaction, the solution was filtrated and the particles were washed with ethanol three times. The washed particles were dried under vacuum at 110° C. overnight to give silicon particles coated with naphthoxazine resin.

Figure 1:
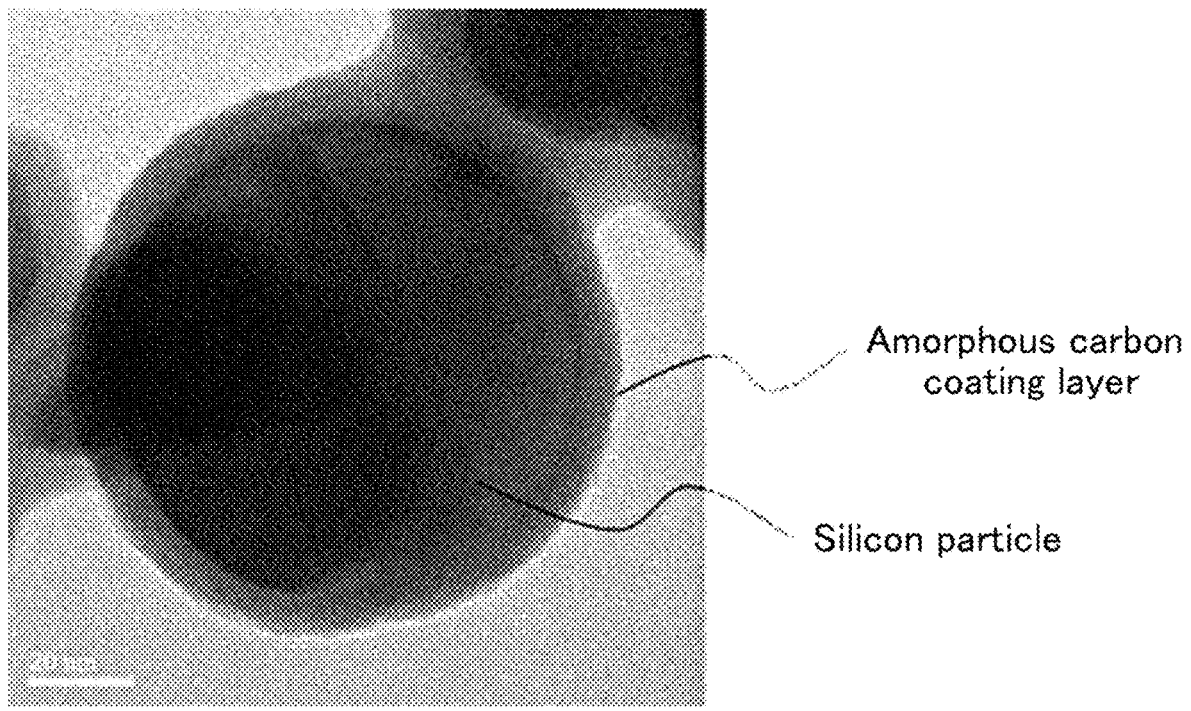
FIG. 1 is a photograph of a carbon-coated silicon particle obtained in Example 1 taken with a transmission electron microscope (TEM).

Subsequently, the coated silicon particles were heated under vacuum at 200° C. for 20 hours, whereby the naphthoxazine resin on the particle surface was carbonized. Thus, carbon-coated silicon particles were obtained. The obtained carbon-coated silicon particle was observed using a transmission electron microscope equipped with an energy dispersive spectroscopy (EDS) detector. FIG. 1 shows a photograph of the carbon-coated silicon particle taken with the transmission electron microscope. FIG. 1 confirms that a carbon coating layer was formed around the silicon particle.

(Raman Spectroscopic Analysis)

The obtained carbon-coated silicon particles were analyzed by Raman spectroscopy using a laser Raman microspectroscopy system Nicolet Almega XR (Thermo Fisher Scientific K.K.). Peaks were observed at both G band and D band, indicating that the naphthoxazine resin was converted into an amorphous carbon.

The peak intensity ratio of G band to D band was 1.2. The laser light had a wavelength of 530 nm.

($^{13}$C Solid-State NMR)

"$^{13}$C solid-state NMR" can be performed using the carbon-coated silicon particles obtained in the example.

In the example, the amorphous carbon coating layer in the amorphous carbon-coated silicon particle surface was thin. Thus, powder of the amorphous carbon alone was prepared using a reaction liquid obtained under the same conditions as those used in coating reaction. The powder of the amorphous carbon alone was heat-treated at 200° C. and then subjected to "$^{13}$C solid-state NMR". Note that the results of $^{13}$C solid-state NMR using the carbon-coated silicon particles do not differ from the results of $^{13}$C solid-state NMR using the powder of the amorphous carbon alone.

Specifically, the powder of the amorphous carbon alone was charged into an 8-mm rotor for solid-state NMR and analyzed by a single pulse (DD MAS) method at a MAS rotation frequency of 7 kHz (device: JNM-ECX400, available from JEOL RESONANCE Inc.). The pulse width obtained using Single Pulse (DD MAS) was 6.32 μsec. The number of scans was 8,025.

The obtained $^{13}$C solid-state NMR spectrum showed that the ratio [sp2/sp3] of a peak derived from a sp2 component (100 to 140 ppm) to a peak derived from a sp3 component (0 to 100 ppm) was 3.3, and that the ratio [C bonded with OH/sp2] of a peak derived from aromatic carbon having a bond with a hydroxy group (140 to 160 ppm) to the sp2 component was 0.1.

Example 2

To a 500-mL flask was added a silicon particle-containing solution containing 6 g of silicon raw material particles (available from Sigma-Aldrich, average particle size: 100 nm) and 160 g of ethanol. The flask was set in an ultrasonic tank held isothermal at 50° C. While simultaneously ultrasonicating and stirring the silicon particle-containing solution, 40 g of a 0.225 mol/L 1,3,5-trimethylhexahydro-1,3, 5-triazine (available from Tokyo Chemical Industry Co., Ltd.) solution in ethanol and 40 g of a 0.225 mol/L 1,5-DHN solution in ethanol were simultaneously added to the flask at a rate of 5 g per minute. After addition, the mixture was reacted for additional four hours.

After reaction, the solution was filtrated and the particles were washed with ethanol three times. The washed particles were dried under vacuum at 110° C. overnight to give silicon particles coated with naphthoxazine resin.

Subsequently, the coated silicon particles were heated under vacuum at 400° C. for 10 hours to give carbon-coated silicon particles in which the naphthoxazine resin on the particle surface was carbonized.

Raman spectroscopic analysis of the obtained carbon-coated silicon particles showed that the naphthoxazine resin was converted into an amorphous carbon.

The peak intensity ratio of G band to D band was 1.5.

Example 3

To a 500-mL flask was added a silicon particle-containing solution containing 3 g of silicon raw material particles (available from Sigma-Aldrich, average particle size: 100 nm) and 160 g of ethanol. The flask was set in an ultrasonic tank held isothermal at 70° C. While simultaneously ultrasonicating and stirring the silicon particle-containing solution, 40 g of a 0.09 mol/L 1,3,5-trimethylhexahydro-1,3,5-triazine (available from Tokyo Chemical Industry Co., Ltd.) solution in ethanol was added, followed by stirring for 30 minutes. Thereafter, 40 g of a 0.09 mol/L 1,5-DHN solution in ethanol was added to the flask at a rate of 10 g per minute. After addition, the mixture was reacted for additional seven hours.

After reaction, the solution was filtrated and the particles were washed with ethanol three times. The washed particles were dried under vacuum at 110° C. overnight to give silicon particles coated with naphthoxazine resin. Subsequently, the coated silicon particles were heated at 200° C. in nitrogen atmosphere for 10 hours, and then heated at 600° C. for additional two hours to give carbon-coated silicon particles in which the naphthoxazine resin on the particle surface was carbonized.

Raman spectroscopic analysis of the obtained carbon-coated silicon particles showed that the naphthoxazine resin was converted into an amorphous carbon.

The peak intensity ratio of G band to D band was 2.1.

Comparative Example 1

The "silicon raw material particles (available from Sigma-Aldrich)" used in Example 1 were used as they were without performing "(Formation of coating layer)".

Comparative Example 2

An amount of 1.5 g of silicon particles (available from Sigma-Aldrich, average particle size: 100 nm) were added to a solution of 1.0 g of glucose in 300 mL of water. The mixture was reacted for one hour while simultaneously ultrasonicating and stirring the mixture. The dispersion was put in a stainless steel pressure-resistant container equipped with a Teflon (registered trademark) liner, and heat-treated at 170° C. for 10 hours. The reaction was followed by cooling to room temperature, a centrifugation step, and a washing step. Thus, carbon-coated silicon particles were obtained.

(Evaluation Method)

(1) Measurement of Coating Layer Thickness (Average Thickness and CV Value)

The average thickness of the coating layer and the CV value were evaluated using a transmission microscope (FE-TEM).

Specifically, cross-sectional photographs of coating layers of randomly selected 20 particles were taken with a FE-TEM. Thereafter, the thickness of the coating layer was randomly measured at 10 different sites on each particle on the obtained cross-sectional photographs, and the average thickness and the standard deviation were calculated. The coefficient of variation of the thickness was calculated from the obtained values.

Since the carbon that coats the surface is significantly different in atom content from the negative electrode active material (e.g., silicon) inside the particle, the thickness of the coating layer (carbon layer) can be estimated from the contrast of the TEM image.

(2) TOF-SIMS Analysis

The coating layer of the obtained particles was analyzed for the mass spectrum derived from the benzene ring (at around 77.12) and the mass spectrum derived from the naphthalene ring (at around 127.27) by time-of-flight secondary ion mass spectrometry (TOF-SIMS).

The TOF-SIMS analysis was performed using TOF-SIMS 5 (available from ION-TOF GmbH) under the following conditions. For avoiding contamination derived from the air or the storage case as far as possible, the produced sample was stored in a clean case for storing silicon wafers.
Primary ion: $^{209}Bi^{+1}$
Ion voltage: 25 kV
Ion current: 1 pA
Mass range: 1 to 300 mass
Analysis area: 500×500 µm
Charge prevention: Neutralization by electronic irradiation
Random raster scan (3) X-Ray Diffraction The diffraction data was obtained using an X-ray diffractometer (SmartLab Multipurpose available from Rigaku Corporation) under the measurement conditions including the X-ray wavelength of CuKα 1.54 A, measurement range of 2θ=10° to 70°, scanning speed of 4°/min, and step of 0.02°. Whether a peak derived from graphite (near 2θ=26.5°) was detected in the obtained diffraction data was determined.

Furthermore, whether a peak derived from SiC (near 2θ=36°) was detected in the obtained diffraction data was determined.

The series of analyses were performed using analysis software (PDXL2).

(4) Zeta Potential

The zeta potential of the particles of the examples and comparative examples was measured using a micro-electrophoresis zeta potential analyzer (M502, available from Nihon Rufuto Co., Ltd.). Specifically, the negative electrode active material for lithium ion batteries was ultrasonically dispersed in a 0.01 mol/L aqueous potassium chloride (KCl) solution. The solution was injected into a measurement cell. A voltage was applied thereto while observing the motion of the particles with a microscope. The potential at which the particles stopped migrating (became still) was measured to determine the zeta potential.

(5) Measurement of Nitrogen Content

The nitrogen content of the coated negative electrode active material was measured by the following method. The elemental composition of the negative electrode active material was analyzed by X-ray photoelectron spectroscopy (device: X-ray photoelectron spectroscope (XPS), PHI 5000 VersaProbe III, available from ULVAC-PHI, Inc.). The percentage (%) of nitrogen in the total amount of all the detected elements taken as 100% was determined as the nitrogen content.

(6) Charge/Discharge Characteristics (Preparation of Negative Electrode)

The particles obtained in each example and comparative example, graphite (OMAC-R, available from Osaka Gas Chemicals Co., Ltd.), acetylene black (Li-400, available from Denka Company Limited.), and polyamic acid (U-Varnish-A, available from Ube Industries, Ltd.) were mixed at a weight ratio of 12.75:72.25:5:10. Thereafter, an appropriate amount of solvent (N-methylpyrrolidone (NMP)) was added, and the mixture was kneaded with RENTARO (AR-100) into uniform paste. The viscosity was adjusted by adjusting the amount of the solvent as needed.

Subsequently, the paste prepared above was applied to a surface of a 20-µm-thick copper foil to a thickness of 60 µm using an applicator (PI-1210, available from Tester Sangyo Co,. Ltd.). The applied film was dried under vacuum at 100° C. for one hour and then heat-treated at 250° C. for 15 hours.

(Preparation of Lithium Ion Battery)

Figure 2:
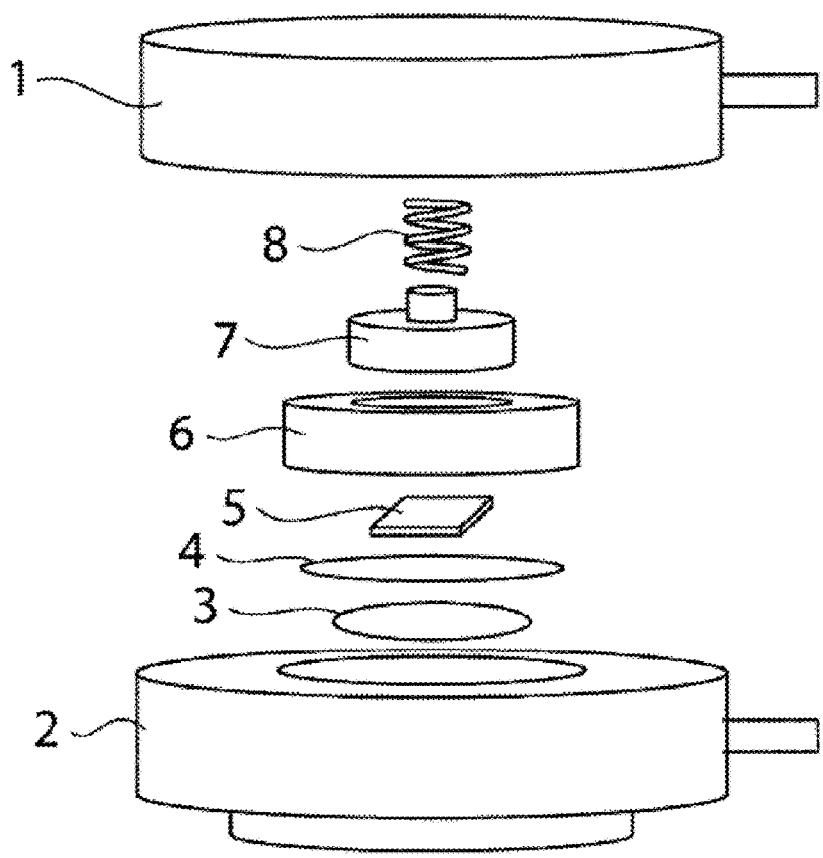
FIG. 2 is a schematic exploded view of a lithium ion battery prepared in "(6) Charge/discharge characteristics" described later.

The entire battery cell assembling process was performed in a vacuum glovebox purged with argon gas. A coin cell (HS cell) having a structure shown in FIG. 2 was used. Between a working electrode 1 and a counter electrode 2 were stacked, in the order from the counter electrode 2 side, a lithium metal piece 3 (Φ10 mm, Li foil having a thickness of 0.2 mm), a separator 4 (ESFINO (25 µm), available from Sekisui Chemical Co., Ltd.), a negative electrode sheet 5 (Φ10 mm, the sheet obtained by the above heat treatment at 250° C.), a resin fixture 6, a collector electrode 7, and a spring 8. The positive electrode was the lithium metal piece 3. The electrolyte solution was a 1 mol/L $LiPF_6$/EC:DMC (1:2 v/v %) solution (available from Kishida Chemical Co., Ltd.).

(Charge/Discharge Test)

The coin cell assembled above was subjected to a charge/discharge test in a voltage range of 1.5 V to 0.02 V at a rate of 0.2 C. Specifically, first, the coin cell was charged in the CCCV mode from 1.5 V to 0.02 V (process of intercalating lithium into silicon). After charging, the coin cell was left at rest for one minute. Next, the coin cell was discharged in the CC mode from 0.02 V to 1.5 V. The coin cell was then left at rest for one minute.

Figure 3:
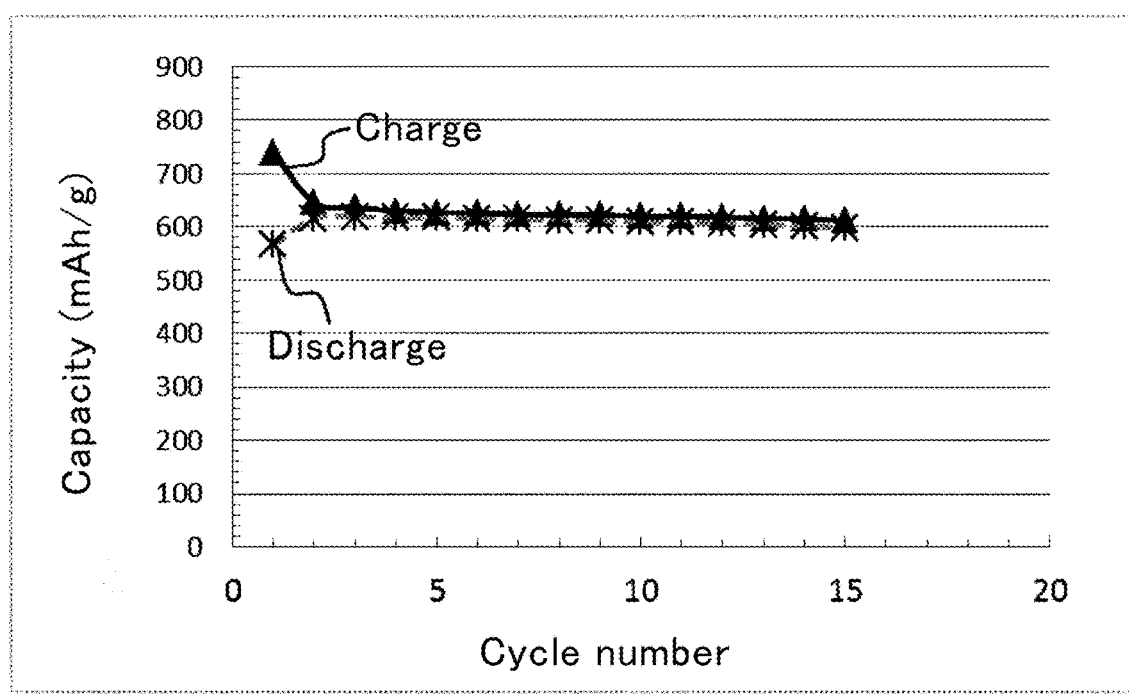
FIG. 3 shows the results of a charge/discharge test of a battery prepared using the particles obtained in Example 1 as a negative electrode active material.
Figure 9:
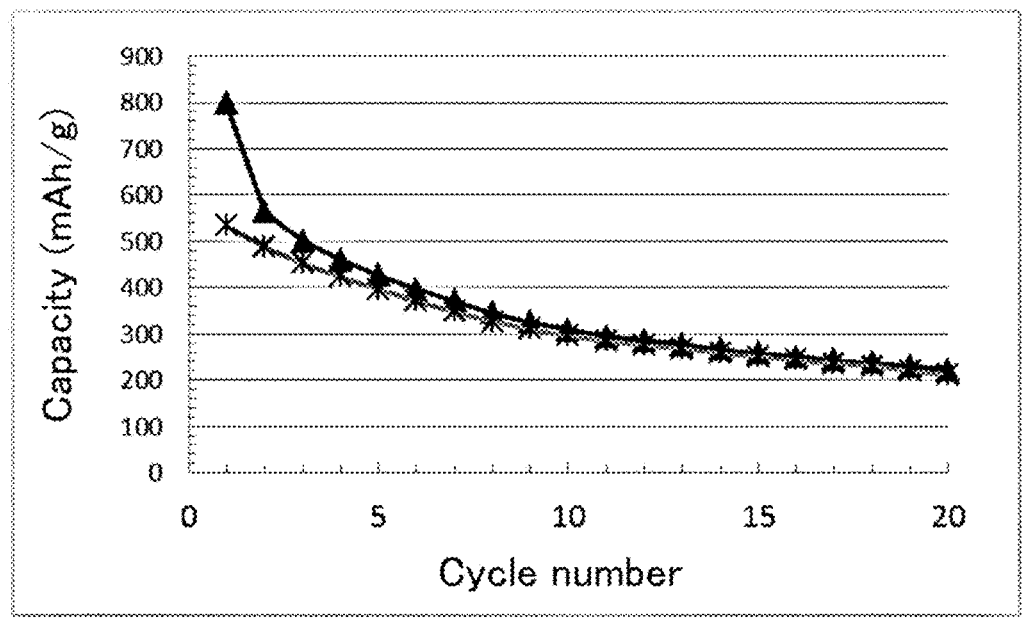
FIG. 9 shows the results of a charge/discharge test of a battery prepared using particles obtained in Comparative Example 1 as a negative electrode active material.

The cycle of charging and discharging was repeated. FIG. 3 shows the results of the charge/discharge test of the battery prepared using the particles obtained in Example 1 as a negative electrode active material. In FIG. 3, the horizontal axis represents the number of charge/discharge cycles and the vertical axis represents the capacity (mAh/g), that is, the charge/discharge characteristics. FIG. 9 shows the results of the charge/discharge test of the battery prepared using the particles obtained in Comparative Example 1 as a negative electrode active material.

FIG. 3 and FIG. 9 clearly demonstrate that the battery prepared using the particles obtained in Example 1 showed less deterioration of the charge/discharge characteristics even after repeated charging and discharging as compared with the uncoated silicon particles (Comparative Example 1).

Figure 4:
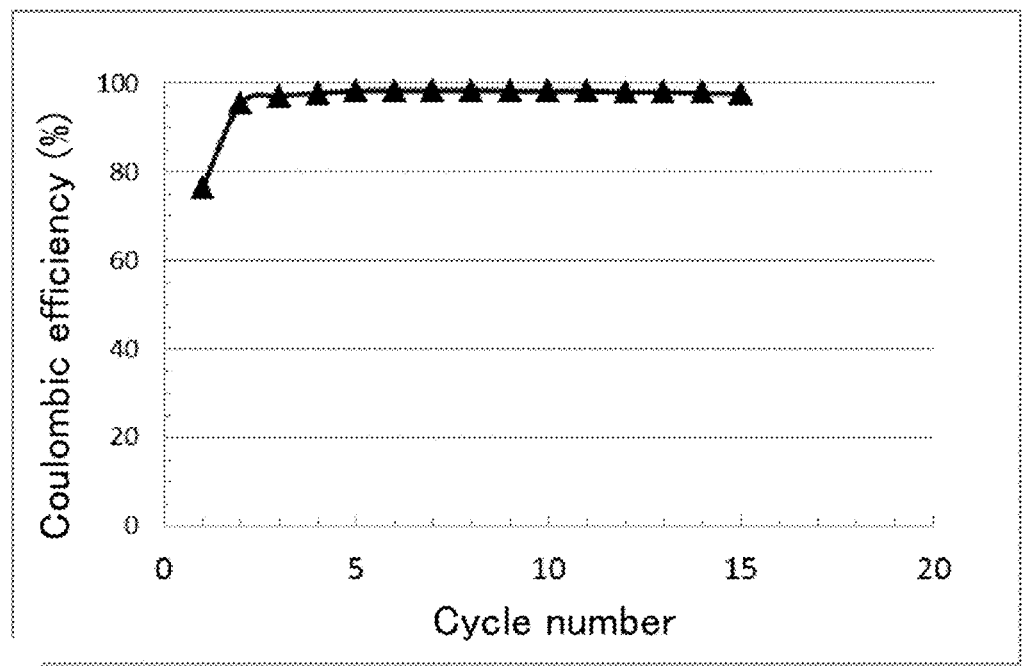
FIG. 4 shows the coulombic efficiency when repeating a charge/discharge cycle using the battery prepared using the particles obtained in Example 1 as a negative electrode active material.
Figure 10:
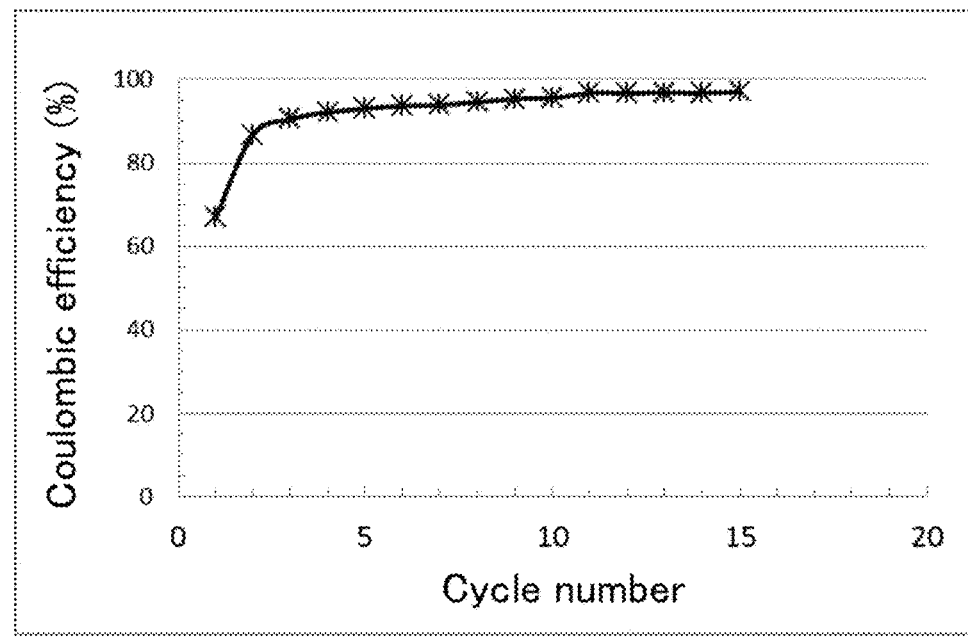
FIG. 10 shows the coulombic efficiency of the battery prepared using the particles obtained in Comparative Example 1 as a negative electrode active material.

FIG. 4 shows the coulombic efficiency when repeating the charge/discharge cycle using the battery prepared using the particles obtained in Example 1 as a negative electrode active material. FIG. 10 shows the coulombic efficiency of the battery prepared using the particles obtained in Comparative Example 1 as a negative electrode active material.

FIG. 4 and FIG. 10 show that the battery prepared using the particles obtained in Example 1 had higher coulombic efficiency not only in the first charge/discharge cycle but also in the second and later cycles as compared with the uncoated silicon particles (Comparative Example 1).

Figure 5:
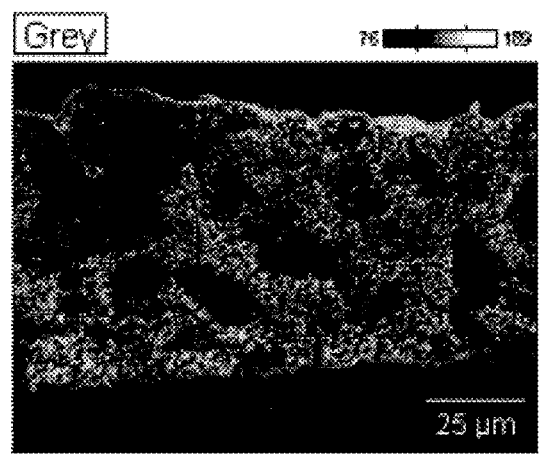
FIG. 5 shows cross-sectional photographs of negative electrodes after repeating a charge/discharge cycle 30 times.
Figure 5:
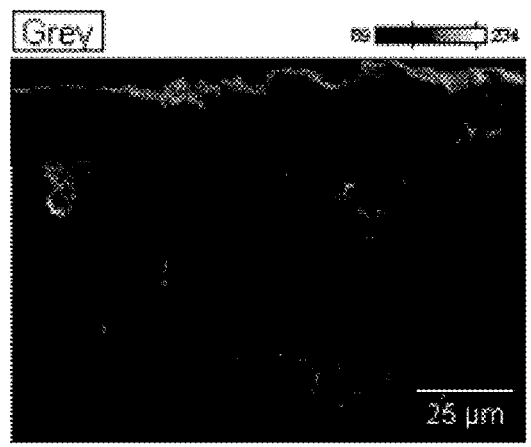

FIG. 5 shows cross-sectional photographs of negative electrodes after repeating the charge/discharge cycle 30 times. FIG. 5(b) shows a negative electrode prepared using the particles obtained in Example 1 as a negative electrode active material. FIG. 5(a) shows a negative electrode prepared using the particles obtained in Comparative Example 1 as a negative electrode active material.

In FIG. 5(a), many white particulate deposits were observed on the electrode surface, whereas in FIG. 5(b), such particulate products were hardly observed.

Elemental composition analysis by EDS and chemical bonding state analysis of elements by XPS suggested that the white particle-form deposits are highly likely to be $Li_2O$, $Li_2CO_3$, and LiF that are products derived from the decomposition of the electrolyte solution during charging and discharging. This indicates that the coating layer formed on the particles obtained in Example 1 has a suppressing effect on the decomposition of an electrolyte solution, one of the causes of a reduction in the battery cycle characteristics.

Figure 6:
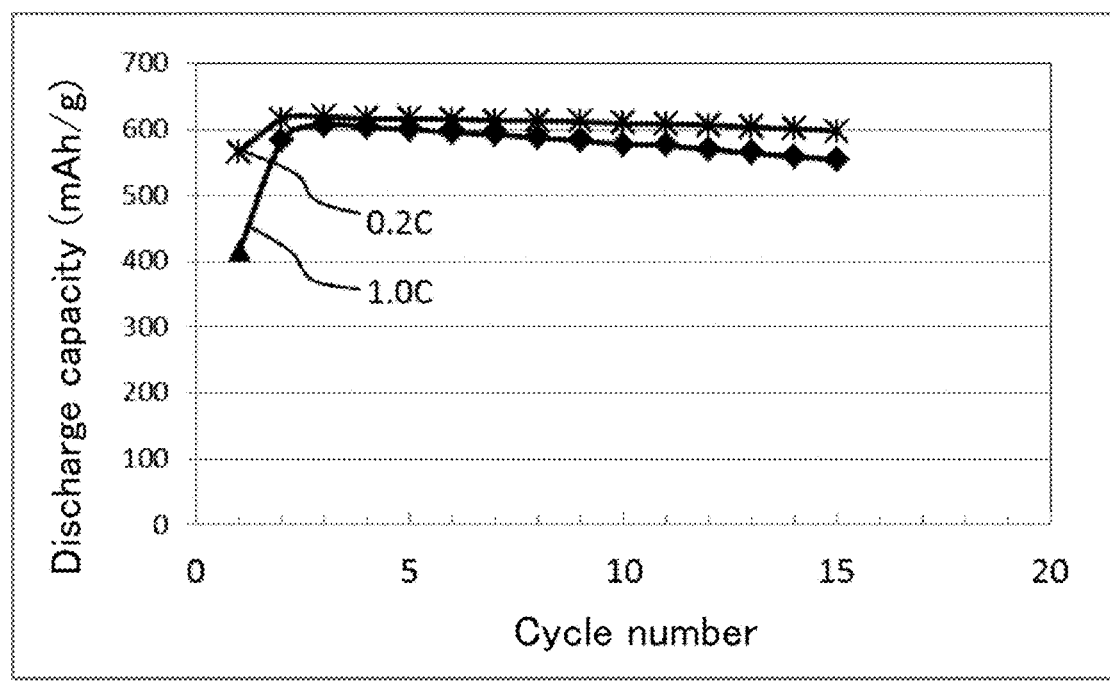
FIG. 6 shows charge/discharge curves obtained by measuring, at different charge/discharge rates, the discharge capacity of the battery prepared using the particles obtained in Example 1 as a negative electrode active material.

FIG. 6 shows charge/discharge curves obtained by measuring, at different charge/discharge rates, the discharge capacity of the battery prepared using the particles obtained in Example 1 as a negative electrode active material. As shown in FIG. 6, the battery had high cycle stability even when the charge/discharge rate was increased to 1.0 C from the original charge/discharge rate 0.2 C. Uncoated silicon particles show an abrupt reduction in the cycle characteristics when charge/discharge rate is increased. This indicates that the amorphous carbon coating has a very high improving effect on the rate characteristics.

Figure 7:
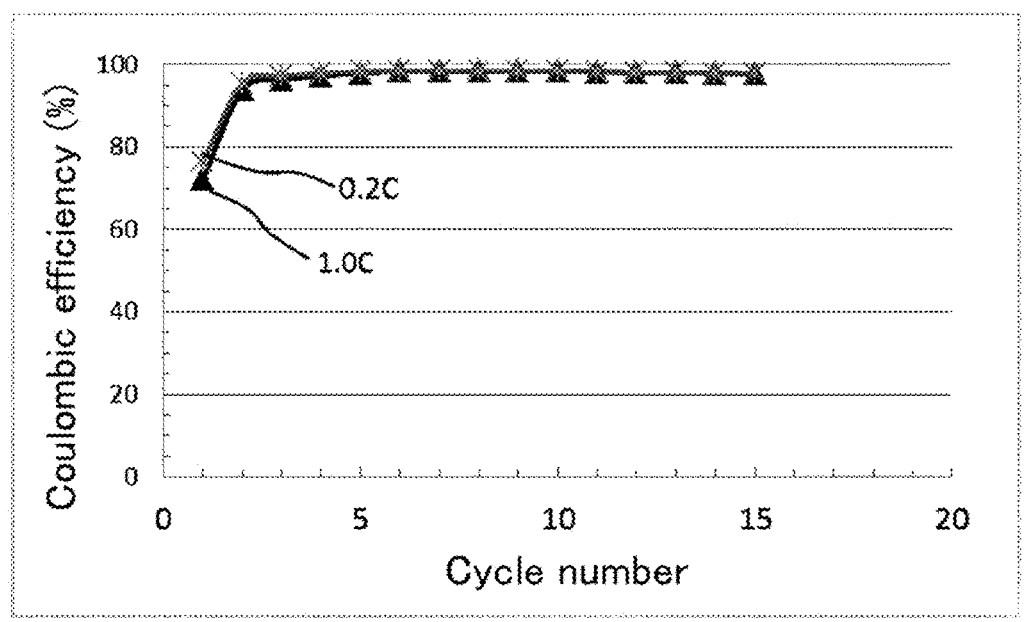
FIG. 7 shows charge/discharge curves obtained by measuring, at different charge/discharge rates, the coulombic efficiency of the battery prepared using the particles obtained in Example 1 as a negative electrode active material.

FIG. 7 shows charge/discharge curves obtained by measuring, at different charge/discharge rates, the coulombic efficiency of the battery prepared using the particles obtained in Example 1 as a negative electrode active material. As shown in FIG. 7, no reduction in the coulombic efficiency was observed even when the charge/discharge rate was increased from 0.2 C to 1.0 C.

Figure 8:
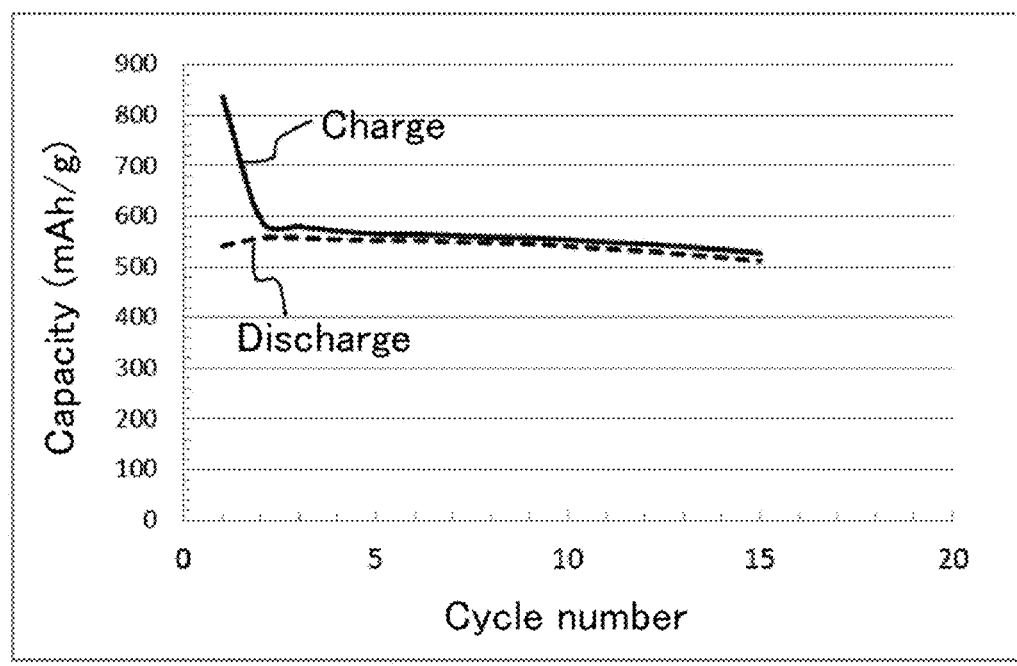
FIG. 8 shows the cycle characteristics of a battery prepared using particles obtained in Example 2 as a negative electrode active material.

FIG. 8 shows the cycle characteristics of the battery prepared using the particles obtained in Example 2 as a negative electrode active material.

The initial discharge capacity ratio [(discharge capacity after second cycle/discharge capacity after first cycle)×100] at a charge/discharge rate of 0.2 C was calculated. Table 1 shows the results.

The discharge capacity retention (%) was calculated from the discharge capacity after the first cycle and the discharge capacity after the fifteenth cycle. Table 1 shows the results.

The initial coulombic efficiency [(discharge capacity in first cycle/charge capacity in first cycle)×100] at a charge/discharge rate of 0.2 C was calculated. Table 1 shows the results.

The ratio of the discharge capacity retention (%) at a charge/discharge rate of 1.0 C to the discharge capacity retention (%) at a charge/discharge rate of 0.2 C [(discharge capacity retention at 1.0 C/discharge capacity retention at 0.2 C)×100] was calculated. Table 1 shows the results.

(7) Measurement of Oxygen Content Ratio at Electrode Film Cross Section Before and after Charging and Discharging A cross section of the electrode sheet before the charge/discharge test (initial electrode film) and a cross section of the electrode film after 30 charge/discharge cycles (charge/discharge rate: 0.2 C) were observed using a field emission scanning electron microscope S-4300SE (available from Hitachi High-Technologies Corporation). The elemental composition of each cross section was analyzed using an energy dispersive X-ray spectrometer (EDS) provided with the microscope. The proportion of oxygen relative to the total of all the detected elements (C, O, Si, F, and P) taken as 100 was determined as the oxygen content (% by weight) of the electrode film cross section.

For the same electrode film, the ratio of the oxygen content after 30 charge/discharge cycles to the initial oxygen content (oxygen content after 30 charge/discharge cycles/ initial oxygen content) was taken as the oxygen content ratio at an electrode film cross section before and after charging and discharging.

The oxygen content ratio at an electrode film cross section before and after charging and discharging was compared between Example 1 and Comparative Example 1. The oxygen content ratio of Comparative Example 1 was 20, whereas the oxygen content ratio of Example 1 was 5.6, which was about one fourth of the oxygen content ratio of Comparative Example 1. This indicates that the oxygen increase after charging and discharging was smaller in the electrode film of Example 1 (amorphous carbon-coated silicon particles) than in the electrode film of Comparative Example 1 (uncoated silicon particles). As described above, the increase in the oxygen content of the electrode film surface after the charge/discharge test was mainly due to $Li_2O$, $Li_2CO_3$, and the like that are decomposition products of the electrolyte solution. The above results thus suggest that the amorphous carbon coating layer formed on the particles obtained in Example 1 has a suppressing effect on the decomposition of the electrolyte solution during charging and discharging.

(8) Impedance Measurement

The coin batteries obtained in the examples and comparative examples were subjected to impedance measurement using a VMP3 multichannel electrochemical measurement system (available from Bio-Logic Science Instruments, France) in a frequency range of 10 mHz to 100 kHz.

Figure 11:
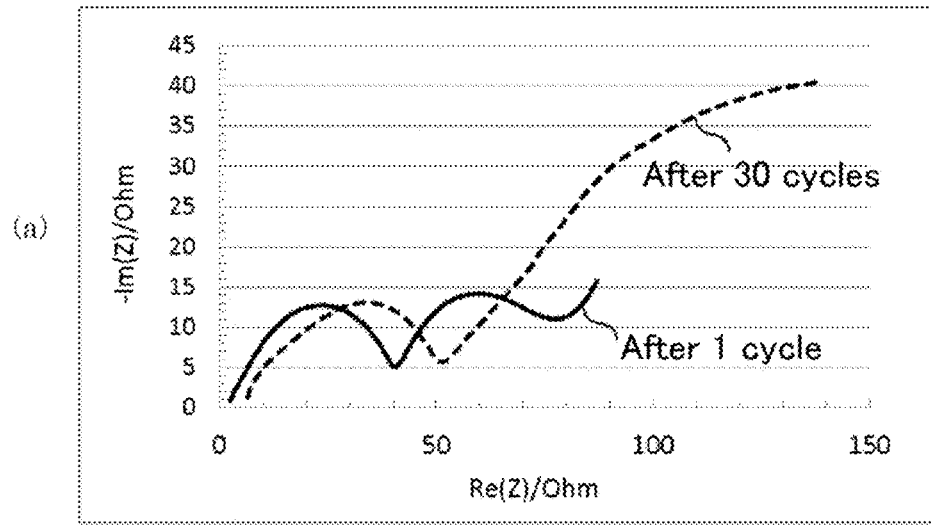
FIG. 11 shows the results (Cole-Cole plot) of impedance measurement of a cell after one charge/discharge cycle and 30 charge/discharge cycles.
Figure 11:
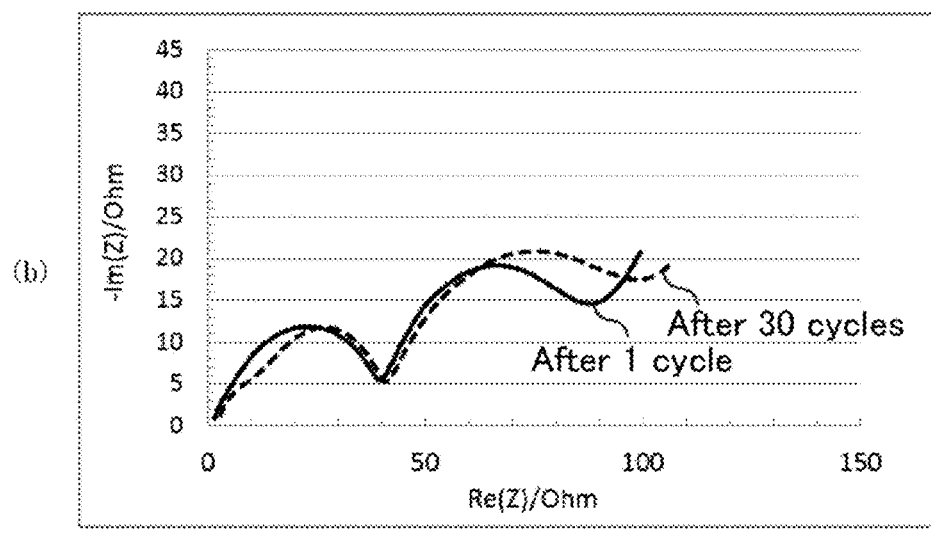

FIG. 11 shows the results (Cole-Cole plot) of the impedance measurement of the cell prepared from the electrode film obtained in Example 1 (FIG. 11(a)) and the cell prepared from the electrode film obtained in Comparative Example 1 (FIG. 11(b)) after one charge/discharge cycle and 30 charge/discharge cycles. In the Cole-Cole plot, a semicircular arc corresponds to the battery internal resistance. The diameter of the semicircular arc corresponds to the resistance value. In other words, a larger semicircular arc indicates a higher resistance, that is, a less preferable battery. As shown in FIG. 11, in Example 1 (FIG. 11(b)), there was no great difference between the size of the semicircular arcs after one charge/discharge cycle and the size of the semicircular arcs after 30 charge/discharge cycles. In contrast, in Comparative Example 1 (FIG. 11(a)), the size of the semicircular arcs after 30 charge/discharge cycles, particularly the right semicircular arc, was significantly increased (although detailed description is omitted, this semicircular arc corresponds to the interfacial charge transfer resistance).

The diameter of the right semicircular arc in each spectrum was measured using analysis software incorporated in the impedance measuring device, and the ratio of the value after 30 cycles to the value after one cycle was determined. In Comparative Example 1 (FIG. 11(a)), the value after 30 cycles was 8 times greater than that after one cycle, whereas in Example 1 (FIG. 11(b)), the value after 30 cycles was 1.2 times greater than that after one cycle. This indicates that forming a predetermined amorphous carbon coating layer on a negative electrode active material as in Example 1 can reduce the increase in resistance after 30 charge/discharge cycles from 8 times to 1.2 times.

TABLE 1

| | Negative electrode active material | | Evaluation of coating layer and particles | | | $^{13}$C solid-state NMR (peak intensity ratio) | | Raman spectroscopic analysis | TOF-SIMS analysis |
|---|---|---|---|---|---|---|---|---|---|
| | | | | Average | CV value of | | C bonded with | (peak intensity | |
| | Material | Form | Material | thickness (nm) | thickness (%) | sp2/sp3 | OH/sp2 | ratio) | Benzene ring |
| Example 1 | Silicon | Particle form | Amorphous carbon | 4 | 6 | 3.3 | 0.1 | 1.2 | Present |
| Example 2 | Silicon | Particle form | Amorphous carbon | 15 | 8 | 5.8 | 0.06 | 1.5 | Present |
| Example 3 | Silicon | Particle form | Amorphous carbon | 5 | 5 | 7.9 | 0.01 | 2.1 | Present |
| Comparative Example 1 | Silicon | Particle form | — | — | — | — | — | — | — |
| Comparative Example 2 | Silicon | Particle form | Carbon | 40 | 30 | 0.85 | — | — | Absent |

| | Evaluation of coating layer and particles | | | | | Charge/discharge characteristics of battery | | | | Oxygen content ratio at electrode film cross section before and after charging and discharging |
|---|---|---|---|---|---|---|---|---|---|---|
| | TOF-SIMS analysis Naphthalene ring | X-ray diffraction | | Zeta potential (mV) | Nitrogen content (% by weight) | Initial discharge capacity ratio | Initial coulombic efficiency | Discharge capacity retention (%) [rate 0.2 C] | Discharge capacity retention ratio [1.0 C/0.2 C] | |
| | | Graphite | SiC | | | | | | | |
| Example 1 | Present | Absent | Absent | −10 | 4.3 | 108 | 78 | 107 | 99.9 | 5.6 |
| Example 2 | Present | Absent | Absent | −40 | 1.3 | 130 | 82 | 126 | 99.5 | 3.2 |
| Example 3 | Present | Absent | Absent | −48 | 0.05 | 122 | 86 | 115 | 99.1 | 9.5 |
| Comparative Example 1 | — | — | — | 20.5 | — | 91.4 | 63 | 50.1 | 30 | 20 |
| Comparative Example 2 | Absent | Absent | Absent | −12 | — | 80 | 60 | 70 | 51 | 16 |

INDUSTRIAL APPLICABILITY

The present invention can provide a negative electrode active material for lithium ion batteries which can achieve excellent cycle characteristics and rate characteristics and high coulombic efficiency, a negative electrode for lithium ion secondary batteries and a lithium ion secondary battery each including the negative electrode active material for lithium ion batteries, and a method for producing a negative electrode active material for lithium ion batteries.

REFERENCE SIGNS LIST 1 working electrode
2 counter electrode
3 lithium metal piece
4 separator
5 negative electrode sheet
6 fixture
7 collector electrode
8 spring

The invention claimed is:

1. A negative electrode active material for lithium ion batteries, comprising:
   a negative electrode active material; and
   a coating layer containing an amorphous carbon on a surface of the negative electrode active material,
   the amorphous carbon constituting the coating layer having
   a ratio of a peak derived from a sp2 component to a peak derived from a sp3 component of 1 or higher as determined by $^{13}$C solid-state NMR, and
   a ratio of a peak derived from aromatic carbon having a bond with a hydroxy group to the peak derived from the sp2 component of 0.2 or lower,
   wherein in analysis of the coating layer by time-of-flight secondary ion mass spectrometry (TOF-SIMS), at least one selected from the group consisting of a mass spectrum derived from a benzene ring and a mass spectrum derived from a naphthalene ring is detected, and
   the negative electrode active material is a silicon-containing compound.

2. The negative electrode active material for lithium ion batteries according to claim 1, which has a zeta potential of 0 to −60 mV.

3. The negative electrode active material for lithium ion batteries according to claim 1,
   wherein the amorphous carbon constituting the coating layer is derived from carbon contained in an oxazine resin.

4. The negative electrode active material for lithium ion batteries according to claim 3,
   wherein the oxazine resin is naphthoxazine resin.

5. The negative electrode active material for lithium ion batteries according to claim 1,
   wherein the amorphous carbon constituting the coating layer has a peak intensity ratio of G band to D band of 1.0 or higher as determined by Raman spectroscopy.

6. The negative electrode active material for lithium ion batteries according to claim 1,
   wherein the coating layer has a nitrogen content of 0 to 5% by weight.

7. The negative electrode active material for lithium ion batteries according to claim 1,
wherein the coating layer has an average thickness of 0.5 nm to 1.0 μm.

8. The negative electrode active material for lithium ion batteries according to claim 1,
wherein in analysis of the coating layer by an X-ray diffraction method, no peak is detected at a position where 2θ is 26.4°.

9. The negative electrode active material for lithium ion batteries according to claim 1,
wherein in analysis of the coating layer by an X-ray diffraction method, no peak is detected at a position where 2θ is 36°.

10. The negative electrode active material for lithium ion batteries according to claim 1,
wherein the negative electrode active material is in a particle form having an average particle size of 10 to 200 nm.

11. A negative electrode for lithium ion secondary batteries, comprising:
the negative electrode active material for lithium ion batteries according to claim 1;
a carbon material;
a conductive aid; and
a binder.

12. The negative electrode for lithium ion secondary batteries according to claim 11,
wherein the binder is at least one selected from the group consisting of styrene-butadiene rubber, carboxymethylcellulose, polyvinylidene fluoride, polyimide, acrylic resin, and butyral resin.

13. A lithium ion secondary battery comprising the negative electrode for lithium ion secondary batteries according to claim 11.

14. A method for producing the negative electrode active material for lithium ion batteries according to claim 1, the method comprising:
preparing a mixed solution containing formaldehyde, an aliphatic amine, and dihydroxy naphthalene;
adding a negative electrode active material to the mixed solution and reacting the mixed solution; and
performing heat treatment.

15. A method for producing the negative electrode active material for lithium ion batteries according to claim 1, the method comprising:
preparing a mixed solution containing triazine and dihydroxy naphthalene;
adding a negative electrode active material to the mixed solution and reacting the mixed solution; and
performing heat treatment.

* * * * *